United States Patent
Philbrick et al.

(10) Patent No.: US 9,719,364 B2
(45) Date of Patent: Aug. 1, 2017

(54) PROCESS OF BOAS GRINDING IN SITU

(71) Applicant: UNITED TECHNOLOGIES CORPORATION, Hartford, CT (US)

(72) Inventors: Graham Ryan Philbrick, Vernon, CT (US); Patrick D Couture, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 81 days.

(21) Appl. No.: 14/613,692

(22) Filed: Feb. 4, 2015

(65) Prior Publication Data

US 2016/0222811 A1    Aug. 4, 2016

(51) Int. Cl.

| | |
|---|---|
| *B24B 21/02* | (2006.01) |
| *B23B 41/00* | (2006.01) |
| *F01D 11/08* | (2006.01) |
| *B24B 55/10* | (2006.01) |
| *B23Q 11/00* | (2006.01) |
| *F01D 25/24* | (2006.01) |
| *F01D 25/12* | (2006.01) |
| *F01D 9/02* | (2006.01) |
| *B24B 19/26* | (2006.01) |

(Continued)

(52) U.S. Cl.
CPC ............ *F01D 11/08* (2013.01); *B23Q 11/005* (2013.01); *B24B 19/26* (2013.01); *B24B 23/08* (2013.01); *B24B 55/10* (2013.01); *F01D 5/005* (2013.01); *F01D 9/02* (2013.01); *F01D 11/10* (2013.01); *F01D 25/12* (2013.01); *F01D 25/24* (2013.01); *F01D 25/246* (2013.01); *F05D 2220/32* (2013.01); *F05D 2230/10* (2013.01); *F05D 2230/18* (2013.01); *F05D 2240/55* (2013.01)

(58) Field of Classification Search
CPC .......... B23B 41/00; B24B 21/02; B24B 19/00
USPC ............ 451/63, 27, 449, 488, 28, 51, 439, 5
See application file for complete search history.

(56) References Cited

U.S. PATENT DOCUMENTS 4,096,614 A * 6/1978 Brungard ................ F01D 9/042
                                                              29/244
4,741,128 A * 5/1988 Reaves ..................... B24B 5/363
                                                              29/889.1

(Continued)

FOREIGN PATENT DOCUMENTS

| EP | 1918524 A2 | 5/2008 |
|---|---|---|
| EP | 2518281 A2 | 10/2012 |
| GB | 2240735 A | 8/1991 |

OTHER PUBLICATIONS

European Search Report for EP 16154192.5 dated Jul. 21, 2016.

*Primary Examiner* — Robert Rose
(74) *Attorney, Agent, or Firm* — Bachman & LaPointe, P.C.

(57) ABSTRACT

A process for machining a turbine engine blade outer air seal in situ, the process comprising replacing a blade with a cutting tool assembly proximate a blade outer air seal, wherein the blade outer air seal is assembled in a gas turbine engine case. The process includes coupling a blower to the blade outer air seal. The blade outer air seal comprises at least one flow path. The process includes creating a purge air stream with the blower through the blade outer air seal. The process includes machining the blade outer air seal, wherein particulate is formed from the machining. The process includes preventing the particulate from blocking the at least one flow path of the blade outer air seal.

15 Claims, 4 Drawing Sheets

(51) Int. Cl.
*B24B 23/08* (2006.01)
*F01D 5/00* (2006.01)
*F01D 11/10* (2006.01)

(56) References Cited

U.S. PATENT DOCUMENTS

| | | | | |
|---|---|---|---|---|
| 4,805,282 | A * | 2/1989 | Reaves | B24B 5/363 |
| | | | | 29/889.1 |
| 5,148,635 | A * | 9/1992 | Porter | B23P 6/002 |
| | | | | 451/296 |
| 5,295,787 | A | 3/1994 | Leonard et al. | |
| 7,029,371 | B1 * | 4/2006 | Bird | B24B 41/04 |
| | | | | 451/11 |
| 8,713,775 | B2 | 5/2014 | Zhang et al. | |
| 8,888,418 | B2 | 11/2014 | Costa et al. | |
| 2011/0180109 | A1 | 7/2011 | Stillman et al. | |
| 2013/0167375 | A1 | 7/2013 | Roesing et al. | |

\* cited by examiner

PROCESS OF BOAS GRINDING IN SITU

BACKGROUND

The present disclosure is directed to the improved process of in situ air seal machining for gas turbine engine outer air seals.

An axial flow, gas turbine engine has a compression section, a combustion section and a turbine section. An annular flow path for the working fluid extends axially through the sections. A stator assembly extends about the annular flow path for confining the working fluid to the flow path and for directing the fluid along the flow path.

As the working fluid flows along the flow path, the working fluid is pressurized in the compression section and burned with fuel in the combustion section to add energy to the working fluid. The hot, pressurized working fluid is expanded through the turbine section to produce work. A major portion of this work is used for driving a free turbine or developing thrust for an aircraft.

A remaining portion of the work generated by the turbine section is not used for these purposes, Instead it is used to compress the working fluid itself. A rotor assembly extends between the turbine section and the compression section to transfer this work from the turbine section to the compression section. The rotor assembly in the turbine section has rotor blades which extend outwardly across the working medium flow path. The rotor blades have airfoils, which are angled with respect to the approaching flow to receive work from the working fluid and to drive the rotor assembly about the axis of rotation.

An outer air seal circumscribes the rotor blades to confine the working fluid to the flow path. The outer air seal is part of the stator structure and is formed of a plurality of arcuate segments. The stator assembly further includes an outer case and a structure for supporting the segments of the outer air seal from the outer case. The outer case and the support structure position the seal segments in close proximity to the blades to block the leakage of the working fluid past the tips of the blades. As a result, the segments are in intimate contact with the hot working fluid, that receives heat from the working fluid and are cooled to keep the temperature of the segments within acceptable limits.

During initial assembly and testing of a gas turbine engine, the interface between the outer air seal and the blade tips may not be properly configured.

Outer air seal variation around the engine wheel (circumferential) directly influences case out-of-roundness. In a system where the blade is allowed to interact with the case (and the blade cuts the case material) this is not a concern. However the modern systems are designed such that they should not interact. When they do the blade wears away, which is a performance detriment.

One way to ensure even outer air seal thickness is to grind the outer air seal as an assembly. This is currently done in an external fixture. The reason to perform the grinding process eternal to the engine is due to the great potential of grinding dust contamination in the engine. Since grinding dust is the inevitable by-product of grinding, grinding in-situ has been avoided. Grinding in-situ greatly increases the chances of the chips/dust becoming clogged-up in cooling holes inside the case.

When machining the outer air seal assembly in the external fixture, the variation between outer air seals is below 0.001". However, when the outer air seals are assembled into an engine the variation increases due to case variation, essentially eliminating much of the external assembly-grind benefit.

Accordingly, it is desirable to provide an efficient system and method to assure a proper outer air seal to blade tip interface, without the need to disassemble and machine in a separate fixture, while avoiding the contamination of grinding dust and debris in the case.

SUMMARY

In accordance with the present disclosure, there is provided a process for machining a turbine engine blade outer air seal in situ, the process comprising replacing a blade with a cutting tool assembly proximate a blade outer air seal, wherein the blade outer air seal is assembled in a gas turbine engine case. The process includes coupling a blower to the blade outer air seal. The blade outer air seal comprises at least one flow path. The process includes creating a purge air stream with the blower through the blade outer air seal. The process includes machining the blade outer air seal, wherein particulate is formed from the machining. The process includes preventing the particulate from blocking the at least one flow path of the blade outer air seal.

In another and alternative embodiment, a process of machining air seals in situ comprises mounting a cutting tool assembly proximate an air seal, wherein the air seal is assembled in a gas turbine engine case. The process includes fluidly coupling a blower to at least one cooling air passage of the gas turbine engine case. The process includes flowing a purge air stream through the at least one cooling air passage. The process includes discharging the purge air stream proximate the air seal.

In another and alternative embodiment, an in situ gas turbine engine air seal machining tool assembly comprises an outer case. An air seal is coupled to the outer case. At least one cooling flow path is formed in the air seal. A cutting tool assembly is mounted in the gas turbine engine proximate the air seal. A blower is fluidly coupled to the at least one cooling flow path. The blower is configured to generate a purge air stream flowing through the at least one cooling flow path. The purge air stream is configured to prevent contamination in the air seal at least one cooling flow path from particulate created by the cutting tool assembly.

Other details of the process are set forth in the following detailed description and the accompanying drawing wherein like reference numerals depict like elements.

DETAILED DESCRIPTION

Figure 1:
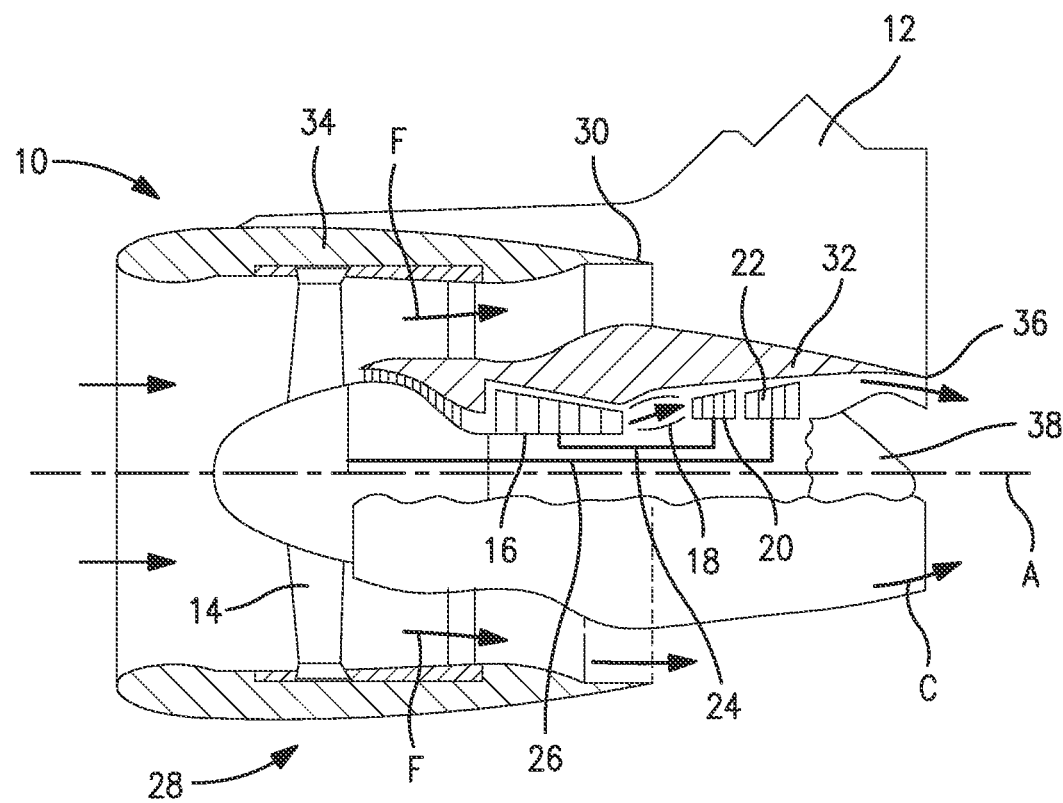
FIG. 1 is a schematic representation of an exemplary gas turbine engine.

FIG. 1 shows a general partial fragmentary view of a gas turbine engine 10 suspended from an engine pylon 12. The engine 10 typically includes in serial flow communication with a low pressure compressor driven fan assembly 14, a high pressure compressor 16, an annular combustor 18, high pressure turbine 20, and low pressure turbine 22. During operation, air is pressurized in the compressor and mixed with fuel in the combustor for generating hot combustion gases which flow through the high and low pressure turbines that extract energy therefrom. The high pressure turbine 20 powers the high pressure compressor through a high pressure turbine/high pressure compressor shaft assembly 24 and the low pressure turbine 22 powers the low pressure compressor fan assembly 14 through a low pressure turbine/fan rotor shaft assembly 26. It should be understood that the shaft assembly 24, 26 may include various shafts which coaxially rotate in a common or counter rotation arrangement.

The exemplary engine 10 is in the form of a high bypass ratio engine mounted within a nacelle assembly 28 in which most of the air pressurized by the fan assembly 14 bypasses the core engine itself for generating propulsion thrust. The fan air F is discharged from the engine 10 through a fan nozzle section 30 defined radially between a core nacelle 32 and a fan nacelle 34. The core exhaust gases C are discharged from the core engine through a core exhaust nozzle 36 defined between the core nacelle 32 and a center plug 38 disposed coaxially therein around an engine longitudinal centerline axis A of the engine 10 and nacelle.

Figure 2:
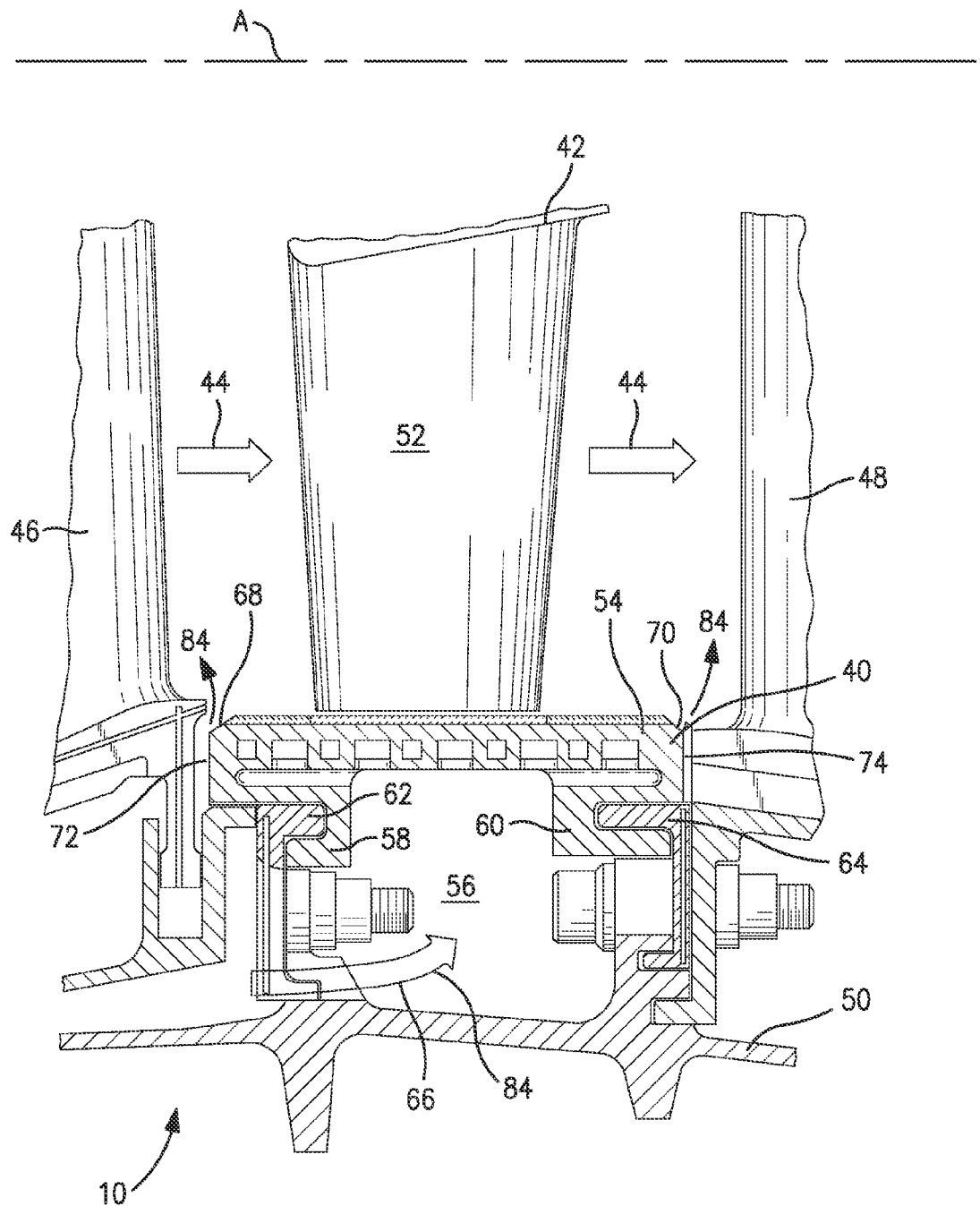
FIG. 2 is a cross-sectional view of a blade and outer air seal portion of the exemplary gas turbine engine.

FIG. 2 shows a portion of the axial flow gas turbine engine 10 having an axis of rotation A defined there through and incorporating the blade outer air seal (BOAS), also known as the outer air seal, or simply seal 40. A portion of one stage 12 of the turbine of the engine 10 is shown in FIG. 2 and includes an annular flow path 44 disposed about the axis A for the combustion gases that are the working fluid of the engine. The turbine stage 42 has one stator assembly 46 axially upstream of the stage 42, and another stator assembly 48 axially downstream thereof. The stators 46, 48 are part of the static structure of the engine 10, and each stator assembly 46, 48 includes an outer case 50. The outer case 50 extends circumferentially around the flow path 44 of working fluid.

The turbine stage 42 has a plurality of rotor blades, which are represented by the single rotor blade 52 in FIG. 2, that extend radially outward relative to the axis A across the flow path 44 into close proximity with the outer case 50. The outer air seal 40 made up of a plurality of arcuate seal segments (represented by the single seal segment 54 in FIG. 2) extends about the axis A to bound the annular flow path 44, and the seal 40 circumscribes the tips of the rotor blades 52. The outer air seal 40 is spaced radially inwardly from the outer case 50 leaving a circumferentially extending cavity 56 therebetween. The cavity 56 is in flow communication with a source of cooling air (not shown) and for cooling the segments 54 of the seal 40. Each arcuate seal segment 54 has an upstream hook 58 and a downstream hook 60 to engage upstream and downstream supports 62, 64, respectively, which extend inwardly from the outer case 50. The supports 62, 64 are attached to the outer case 50 to support and position the outer air seal 40 about the rotor blades 52. Each support 62, 64 may be segmented to reduce the hoop strength of the support 62, 64.

A first flow path 66 for cooling air extends inwardly of the outer case 50. The cooling air flow path is bounded by the outer case 50 and extends through the engine outwardly of the flow path 44 of the working fluid. The cooling airflow path extends into the cavity 56 between the outer air seal 49 and the outer case 50.

Each seal segment 54 of the outer air seal 40 has a leading edge 68 and a trailing edge 70. The leading edge 68 is in spaced relation to the adjacent stator assembly 46 leaving a circumferentially extending cavity 72 therebetween. The cavity 72 forms a second cooling air flow path which extends axially and circumferentially beneath the leading edge region. The trailing edge 70 is in spaced relation to adjacent stator assembly 48 leaving an annular cavity 74 therebetween, which forms a third cooling airflow path.

Figure 3:
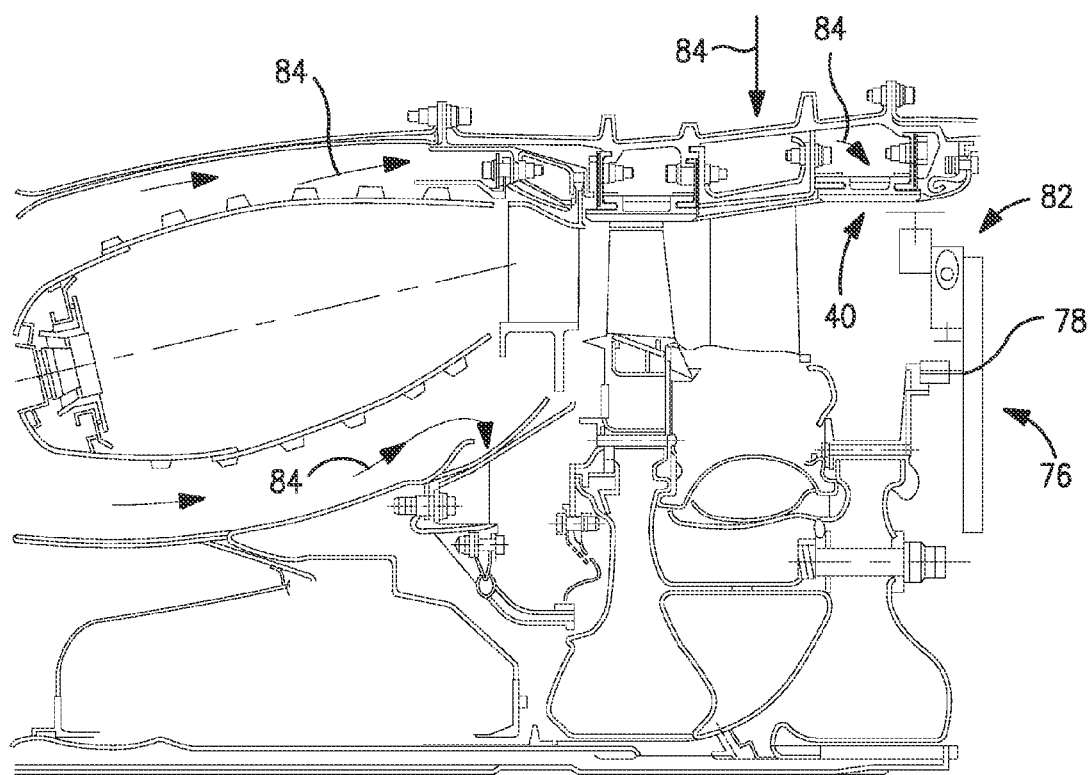
FIG. 3 is a is a cross-sectional view of a portion of the gas turbine engine with an exemplary in-situ machine location.

Referring to FIG. 3 an exemplary in situ seal machining tool 76 is illustrated mounted to the rotor shaft assembly in place of the blade (not shown) in the case. The tool 76 generally includes a mount 78 a beam 80 attached to the mount 78 and a cutting tool assembly 82. The machining tool 76 permits machining of the seal 40 in situ.

In order to facilitate machining of the seal 40 in situ, while avoiding the contamination of the dust resulting from the grinding, a purge air stream 84 is created. The purge air stream 84 is created by blowing air into the cooling air passages of the turbine sections. Various turbine sections are pressurized with air, thus creating a positive air pressure that drives the purge air stream 84 from within the casing outwardly and away from locations that would otherwise trap the dust and debris that results from grinding the seals 40.

Figure 4:
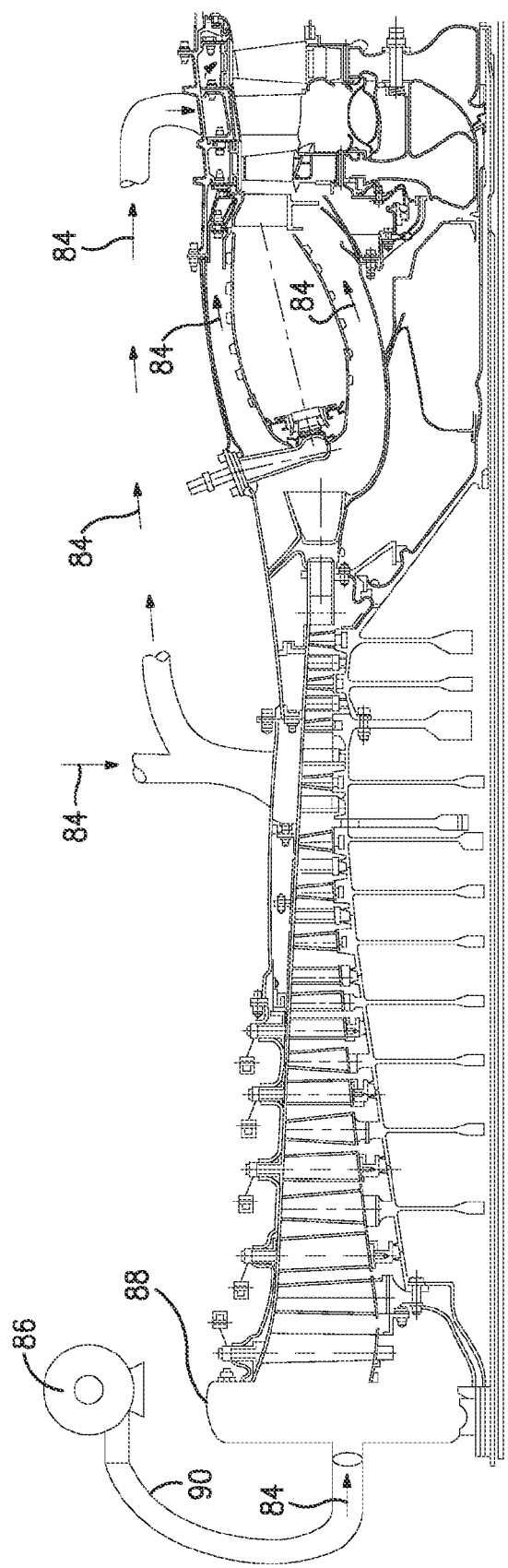
FIG. 4 is a cross-sectional view of an exemplary engine with purging air.

FIG. 3 and FIG. 4 show exemplary locations of the purge air stream 84 and locations for the purge air stream 84 to be created by fluidly coupling a blower 86 at certain locations to drive the purge air stream 84. As shown in FIG. 4 the blower 86 can be fluidly coupled to a shroud 88 via air conduit 90. In an exemplary embodiment, the purge air 84 and be supplied proximate to TCA $2^{nd}$ vane supply as well as any direct diffuser exit feed area. The purge air 84 supplied to the locations that are near the outer air seals 40 being ground, flows out of the various cooling orifices. For example, as shown in FIG. 2, the first flow path 66, second and third flow paths, through cavity 72 and annular cavity 74.

The benefit of the purge airflow 84 to the in situ machining, is that any particulates created by the machining are blown out of the cooling holes, preventing contamination, and potential blockage. The grinding dust is prevented from collecting in unwanted locations. By use of the purge air 84, the seals 40 can be machined in situ, thus allowing for the elimination of any casing variations. Tight tolerances can be achieved, such as a sub 0.001 inch circumferential variation for the outer air seal radius variation. Tighter blade tip clearances will be achievable. Tighter blade tip clearances directly contribute to increase in turbine engine performance.

There has been provided a process. While the process has been described in the context of specific embodiments thereof, other unforeseen alternatives, modifications, and variations may become apparent to those skilled in the art having read the foregoing description. Accordingly, it is intended to embrace those alternatives, modifications, and variations, which fall within the broad scope of the appended claims.

What is claimed is:

1. A process of machining air seals in situ comprising:
   mounting a cutting tool assembly proximate an air seal, wherein said air seal is assembled in a gas turbine engine case;
   fluidly coupling a blower to a shroud attached to said gas turbine engine case fluidly coupled to at least one cooling air passage of said gas turbine engine case;
   flowing a purge air stream from said blower through said shroud through said at least one cooling air passage; and
   discharging said purge air stream proximate said air seal.

2. The process according to claim 1, wherein said purge air stream prevents particulate contamination in said gas turbine engine case.

3. The process according to claim 1, wherein said purge air stream maintains cooling air passages of said air seal clear of particulate contamination resulting from operation of said cutting tool assembly.

4. The process according to claim 1, further comprising coupling said blower to said cooling air passage proximate at least one of a TCA $2^{nd}$ vane supply and at least one direct diffuser exit feed area.

5. The process according to claim 1, further comprising machining said air seal with said cutting tool assembly in situ.

6. The process according to claim 1, wherein said air seal comprises a blade outer air seal.

7. An in situ gas turbine engine air seal machining tool assembly comprising:
   an outer case;
   an air seal coupled to said outer case;
   at least one cooling flow path formed in said air seal;
   a cutting tool assembly mounted in said gas turbine engine proximate said air seal;
   a blower fluidly coupled to said case with a shroud coupled to said case, wherein said shroud is fluidly coupled to said at least one cooling flow path, said blower configured to generate a positive purge air stream flowing through said shroud to said at least one cooling flow path; and
   said purge air stream configured to prevent contamination in said air seal at least one cooling flow path from particulate created by said cutting tool assembly.

8. The turbine engine component according to claim 7, wherein said air seal comprises a blade outer air seal.

9. The assembly according to claim 8, wherein said cutting tool assembly is configured to grind portions of said air seal.

10. The assembly according to claim 7, wherein said blower is fluidly coupled to said at least one cooling flow path at sections of said outer case proximate at least one of a TCA $2^{nd}$ vane supply and at least one direct diffuser exit feed area.

11. The assembly according to claim 7, wherein said at least one cooling flow path includes a first flow path, a second flow path and a third flow path of said air seal.

12. A process for machining a turbine engine blade outer air seal in situ, said process comprising:
   replacing a blade with a cutting tool assembly proximate a blade outer air seal, wherein said blade outer air seal is assembled in a gas turbine engine case;
   coupling a blower to said gas turbine engine case with a shroud formed over an opening in said case, said opening in said case being in fluid communication with at least one flow path formed in said blade outer air seal;
   creating a purge air stream with said blower flowing downstream from said blower through said shroud and through said opening in said case through said at least one flow path and through said blade outer air seal; and
   machining said blade outer air seal, wherein particulate is formed from said machining; and
   preventing said particulate from blocking said at least one flow path of said blade outer air seal.

13. The process of claim 12, wherein said blower is fluidly coupled to all sections of said gas turbine engine case.

14. The process of claim 12, wherein said purge air stream flows through said gas turbine engine case and exits proximate said machining of said blade outer air seal.

15. The process of claim 12, wherein said machining comprises a circumferential grind configured to minimize blade outer air seal radius variation.

* * * * *